United States Patent Office 2,838,450
Patented June 10, 1958

2,838,450

PROCESS FOR THE SEPARATION OF A MIXTURE OF BENZENE AND PARAFFINS

Georges Jules Pierre Souillard, Brussels, Belgium

No Drawing. Application April 4, 1955
Serial No. 499,220

Claims priority, application France July 22, 1950

2 Claims. (Cl. 204—163)

This invention relates to a process for the separation of a mixture of benzene and paraffins in which the paraffin content is low, and is a continuation-in-part of my copending application Serial No. 237,674, filed July 19, 1951, now Patent No. 2,707,197, issued April 26, 1955.

The benzenes of crude oil origin, such as those which originate from gasification of coal at low temperature, contain saturated paraffinic hydrocarbons such as chiefly the n-heptane and 2-2-4 trimethylpentane which, when distilled at 80.1° C., yield azeotropes containing respectively 99.3 and 97.7% benzene and therefore cannot be economically separated by distillation.

The presence of these paraffinic impurities in benzene, the contents of which vary in commercial products between 0.5 to 2%, results in an alteration of certain physical characteristics of the products, such as the congealing point, the density and index of refraction, which makes it difficult to obtain pure products.

The elimination of these impurities is particularly costly and difficult to carry out industrially by the usual techniques of azeotropic distillation and extractive distillation. The paraffinic nature of the impurities renders their elimination especially difficult by conventional chemical methods.

According to this invention a method is provided whereby it is easier and more economical to utilize photochemical chlorination, which makes it possible to act selectively on paraffinic impurities, since the quantitative yield is much higher than that of the chlorination of the benzene (1000 times more than the chlorination of benzene).

In tests made according to the invention at atmospheric temperature benzene to be treated was subjected to the action of chlorine in the presence of ultraviolet light of a wave length in the range of 2500 and 4500 A. The chlorine introduced into the benzene is measured by a flow-meter. In all cases all the chlorine introduced completely reacted.

After the chlorination was terminated the product was neutralized with dry sodium carbonate, then subjected to a physical separation operation.

Any known type of chlorinating apparatus can be used, for example, a glass vessel provided with an efficient agitating device, a helical tube condenser cooled with low temperature refrigerant for efficiently returning as reflux any of hydrocarbon liquid entrained by evolved HCl, and an inlet tube for chlorine immersed in the mixture to be chlorinated, and a source of ultraviolet light for irradiation of the benzene mixture. Any other chlorinating vessel can be used provided the benzene introduced can be exposed to the ultraviolet light.

Several types of benzene mixtures containing varying proportions of paraffins can be treated by the process according to this invention, either in discontinuous or continuous operation.

The following examples describe the purifying experiments made with the two benzene types. In the examples the temperatures are expressed in degrees centigrade.

Example 1

In the apparatus previously described of a capacity of 1500 parts by volume illuminated by an ultraviolet mercury arc lamp of 125 watts, the emission spectrum of which is a maximum at about 3400–3500 A., there is introduced 1000 grams of impure benzene of the following physical characteristics: $d_{15}^{15}=0.882$, $n_D^{20}=1.4988$. Freezing point: 4.9° C., free of olefins, containing only traces of thiophene and containing about 1% (mol percent) of paraffins.

Chlorine is introduced into the benzene over a period of 40 minutes at a rate of 0.25 mol per hour, which represents a total of 0.17 mol of chlorine introduced. After complete reaction of the chlorine, the reaction product was neutralized with sodium carbonate and subjected to distillation. There was recovered in this manner 950 grams of benzene of high purity entirely free from olefins, thiophene and paraffins, the characteristics of which come very close to those of pure benzene as the following table shows:

|  | $d_{15}^{15}$ | Freezing point, °C. | $n_D^{20}$ |
|---|---|---|---|
| Benzene purified by this example | 0.884 | 5.51 | 1.5012 |
| Pure benzene | 0.885 | 5.53 | 1.5014 |

Example 2

Into the same apparatus as in Example 1, 1000 grams of impure benzene containing traces of olefins, thiophene and about 1.7% (mol percent) of paraffins are introduced.

The other chief characteristics of the benzene used are: $d_{15}^{15}=0.881$, $n_D^{20}=1.4985$. Melting point: 4.3° C.

Chlorine was introduced following the same procedure as in Example 1 for a period of 70 minutes at the same flow rate of 0.25 mol per hour (which represents a total quantity of 0.29 mol of chlorine). After complete reaction of the chlorine, followed by neutralization and distillation, of the reaction product there was obtained 950 grams of benzene of high purity entirely free from olefins, thiophene and paraffins, the characteristics of which are compared with those of pure benzene in the following table:

|  | $d_{15}^{15}$ | Melting point, °C. | $n_D^{20}$ |
|---|---|---|---|
| Benzene purified by Example 2 | 0.884 | 5.51 | 1.5011 |
| Pure benzene | 0.885 | 5.53 | 1.5014 |

Example 3

The benzene purification was carried out continuously in an apparatus comprising a tubular column of 7 mm. diameter and 1 meter height exposed to light emitted by a fluorescent lamp of a power of 40 watt, the emission spectrum of which has a maximum at about 3500 A. 4000 grams per hour of impure benzene, identical with that of Example 1, is introduced into the tube together with chlorine at a rate of 0.68 mol per hour, in a continuous current, the reaction taking place quantitatively as the current of fluids moves through the tubular reaction zone. At the outlet of the apparatus the reaction product is removed, neutralized and finally distilled as in other examples. In this manner 3200 grams of pure benzene per hour were recovered, the characteristics of which are identical with those of the refined benzene obtained in Example 1.

*Example 4*

Benzene identical with that mentioned in Example 2 was continuously treated in an apparatus as described in Example 3. 2000 grams of the benzene of Example 1 were introduced per hour together with 0.58 mol of chlorine into the tubular reaction zone, the chlorine reacting quantitatively. At the outlet of the apparatus the reaction product is recovered, neutralized and distilled. There is obtained under these conditions 1980 grams per hour of purified benzene, the characteristics of which are identical with those of the purified benzene obtained in Example 2.

The characteristics of the purified products in comparison with initial benzenes and the pure benzene are grouped in the following table:

| | Initial Benzene, Example No. 1 | Purified Benzene, Example No. 1 | Pure Benzene | Purified Benzene, Example No. 2 | Initial Benzene, Example No. 2 |
|---|---|---|---|---|---|
| $d_{15}^{15}$ | 0.882 | 0.884 | 0.885 | 0.884 | 0.881. |
| Freezing point | 4.9° C | 5.51° C | 5.53° C | 5.51° C | 4.3° C. |
| $n_D^{20}$ | 1.4988 | 1.5012 | 1.5014 | 1.5011 | 1.4985. |
| Olefins | none | none | none | none | traces. |
| Thiophene | traces | ---do---- | ---do---- | ---do---- | present. |
| Paraffins (mol percent) | about 1% | ---do---- | ---do---- | ---do---- | about 1.7%. |

The process as described can be applied to other impure benzenes containing paraffins in low proportions. One can also use any ultraviolet light of a wave length between 2500 and 4500 A. The best yields are obtained with an ultraviolet light, the emission spectrum of which has a maximum of about 3400 to 3500 A.

Having thus described the invention what is claimed is:

1. A method for separating the components of a mixture consisting essentially of benzene and paraffins wherein the paraffins are present in minor proportion, comprising analyzing the mixture to determine quantitatively the quantity of paraffins present in the mixture, and then passing chlorine into the mixture in a slight molecular excess with respect to the paraffins under conditions to selectively and quantitatively chlorinate the paraffin hydrocarbon consisting essentially of irradiating the reaction mixture with ultraviolet light, and at ambient temperature, and then physically separating the chlorinated paraffins from the benzene.

2. A method for separating the components of a mixture consisting essentially of benzene and paraffins wherein the paraffins are present in minor proportion, comprising analyzing the mixture to determine quantitatively the quantity of paraffins present in the mixture, and then passing chlorine into the mixture in a slight molecular excess with respect to the paraffins under conditions to selectively and quantitatively chlorinate the paraffin hydrocarbon consisting essentially of irradiating the reaction mixture with ultraviolet light, the emission spectrum of which has a wave length of between 2500 to 4500 A., at ambient temperature, and then physically separating the paraffins from the benzene.

References Cited in the file of this patent

UNITED STATES PATENTS

| | | |
|---|---|---|
| 1,741,305 | Jaeger | Dec. 31, 1929 |
| 2,324,249 | Vaughan et al. | July 13, 1943 |
| 2,707,197 | Souillard | Apr. 26, 1955 |